United States Patent
Shoji et al.

(10) Patent No.: US 8,573,690 B2
(45) Date of Patent: Nov. 5, 2013

(54) SHOCK ABSORBING APPARATUS FOR AIRCRAFT SEAT

(75) Inventors: Hirokazu Shoji, Tokyo (JP); Kazuo Katayama, Hyogo (JP); Norio Enomoto, Hyogo (JP); Hiroshi Yutani, Hyogo (JP)

(73) Assignee: Japan Aerospace Exploration Agency, Osaka-shi (JP)

( * ) Notice: Subject to any disclaimer, the term of this patent is extended or adjusted under 35 U.S.C. 154(b) by 360 days.

(21) Appl. No.: 13/057,442

(22) PCT Filed: Aug. 3, 2009

(86) PCT No.: PCT/JP2009/003676
§ 371 (c)(1),
(2), (4) Date: Feb. 3, 2011

(87) PCT Pub. No.: WO2010/016220
PCT Pub. Date: Feb. 11, 2010

(65) Prior Publication Data
US 2011/0133539 A1 Jun. 9, 2011

(30) Foreign Application Priority Data
Aug. 4, 2008 (JP) ................................. 2008-200511

(51) Int. Cl.
*B60N 2/42* (2006.01)
(52) U.S. Cl.
USPC ...................................................... 297/216.1
(58) Field of Classification Search
USPC ............... 297/452.41, 216.1, DIG. 3, DIG. 8, 297/216.13; 5/655.3, 654, 706
See application file for complete search history.

(56) References Cited

U.S. PATENT DOCUMENTS

| | | | |
|---|---|---|---|
| 2,434,641 A * | 1/1948 | Burns | 267/117 |
| 2,987,735 A * | 6/1961 | Nail | 428/12 |
| 5,918,696 A * | 7/1999 | VanVoorhies | 180/273 |
| 6,560,803 B2 * | 5/2003 | Zur | 5/654 |
| 8,104,125 B2 * | 1/2012 | Soltani et al. | 5/706 |

(Continued)

FOREIGN PATENT DOCUMENTS

| | | |
|---|---|---|
| GB | 2 302 526 A | 1/1997 |
| JP | 4-224437 A | 8/1992 |

(Continued)

OTHER PUBLICATIONS

English translation of International Preliminary Report on Patentability (Form PCT/IB/373) and of Written Opinion of the International Searching Authority (Form PCT/ISA/237) issued on Mar. 8, 2011 in International Application No. PCT/JP2009/003676.

(Continued)

*Primary Examiner* — Milton Nelson, Jr.
(74) *Attorney, Agent, or Firm* — Birch, Stewart, Kolasch & Birch, LLP

(57) ABSTRACT

A shock absorbing apparatus for an aircraft seat that attenuates shock to passengers and crews includes; an airbag 11 being expanded in a plate shape in a state of less than maximum expansion; an upper flat plate 12 arranged on one side of the airbag 11; a lower flat plate 13 arranged on another side of the airbag 11; a gas supply device 15 for supplying a gas to the airbag 11; and a detector sending a signal to activate the gas supply device 15 by a preset condition. The shock is absorbed by expanding the airbag 11 before the shock is applied to the passenger.

6 Claims, 3 Drawing Sheets

(56) References Cited

U.S. PATENT DOCUMENTS

2003/0052519 A1     3/2003    Reynolds et al.
2008/0005843 A1*    1/2008    Lokhorst et al. ............... 5/655.3

FOREIGN PATENT DOCUMENTS

| | | |
|---|---|---|
| JP | 5-116589 A | 5/1993 |
| JP | 2006-123802 A | 5/2006 |
| WO | WO 9841126 A1 * | 9/1998 |

OTHER PUBLICATIONS

European Search Report issued in European Application No. 09804707.9 on Jul. 12, 2013.

* cited by examiner

SHOCK ABSORBING APPARATUS FOR AIRCRAFT SEAT

BACKGROUND OF THE INVENTION

1. Field of the Invention

The present invention relates to a shock absorbing apparatus for an aircraft seat and an aircraft seat using the same.

2. Description of the Related Art

Apparatuses utilizing airbags are known for the purpose of protecting occupants from shock in such a case of body landing of an aircraft.

JP-A No. 2006-123802 discloses a landing shock absorbing apparatus equipped with seat holding and lowering means that lowers a seat from a predetermined position when landing shock is applied and an airbag provided between the seat and a floor surface. This apparatus absorbs the shock with both lowering of the seat and the airbag expanded at a predetermined pressure in advance.

JP-A No. 4-224437 discloses a device for occupant protection by sandwiching and holding an occupant from above and below, front and back, and right and left with airbags.

SUMMARY OF THE INVENTION

The present invention provides a shock absorbing apparatus for an aircraft seat utilizing expansion of an airbag or expansion and deflation of an airbag and an aircraft seat using the same.

The present invention provides each of the inventions 1 and 3 below.

1. A shock absorbing apparatus for an aircraft seat, including:
    an airbag being expanded in a plate shape in a state of less than the maximum expansion;
        a gas supply device to supply a gas to the airbag; and
        a detector sending a signal to activate the gas supply device by a preset condition.
3. A shock absorbing apparatus for an aircraft seat, including:
    an airbag being expanded in a plate shape in a state of less than the maximum expansion;
        an upper flat plate arranged on one side of the airbag;
        a lower flat plate arranged on another side of the airbag;
        a gas supply device to supply a gas to the airbag; and
        a detector sending a signal to activate the gas supply device by a preset condition.

DETAILED DESCRIPTION OF THE INVENTION

By using the shock absorbing apparatus for an aircraft seat of the present invention, performance of protecting passengers and crews when shock is applied to a fuselage is enhanced.

The present invention provides the embodiments 2, 4 to 9 below.

2. The shock absorbing apparatus for an aircraft seat according to the above invention 1, including at least one of an upper flat plate arranged on an upper side of the airbag and a lower flat plate arranged on a lower side of the airbag.
4. The shock absorbing apparatus for an aircraft seat according to any one of the above inventions 1 and 3 and the above embodiment 2, including gas discharge member to deflate the airbag by discharging an excessive amount of gas from the airbag after the gas is supplied from the gas supply device to the airbag.
5. The shock absorbing apparatus for an aircraft seat according to the above invention 3 or the above embodiment 4, wherein
    the upper flat plate has a lowering restriction member arranged vertically on the airbag side,
    the lower flat plate is arranged at an interval from the lowering restriction member, and
    the lowering restriction member of the upper flat plate abuts against the lower flat plate when the airbag deflates after activation, and thereby lowering of the upper flat plate is restricted.
6. The shock absorbing apparatus for an aircraft seat according to any one of the above invention 3 and the above embodiments 4 and 5, wherein
    the upper flat plate has a rising limitation member arranged vertically on the airbag side, and
    the lower flat plate abuts against the rising limitation member due to expansion of the airbag after activation to limit a distance between the upper flat plate and the lower flat plate and to suppress excessive expansion of the airbag.
7. The shock absorbing apparatus for an aircraft seat according to any one of the above inventions 1 and 3 and the above embodiments 2, 4 to 6, wherein the apparatus is entirely surrounded by a stretchable bag member.
8. The shock absorbing apparatus for an aircraft seat according to anyone of the above inventions 1 and 3 and the above embodiments 2, 4 to 7, wherein the apparatus is located inside a seat unit of the aircraft seat or on the seat unit.
9. An aircraft seat, including the shock absorbing apparatus according to anyone of the above inventions 1 and 3 and the above embodiments 2, 4 to 8, located inside a seat unit of the aircraft seat or on the seat unit.

Figure 1:
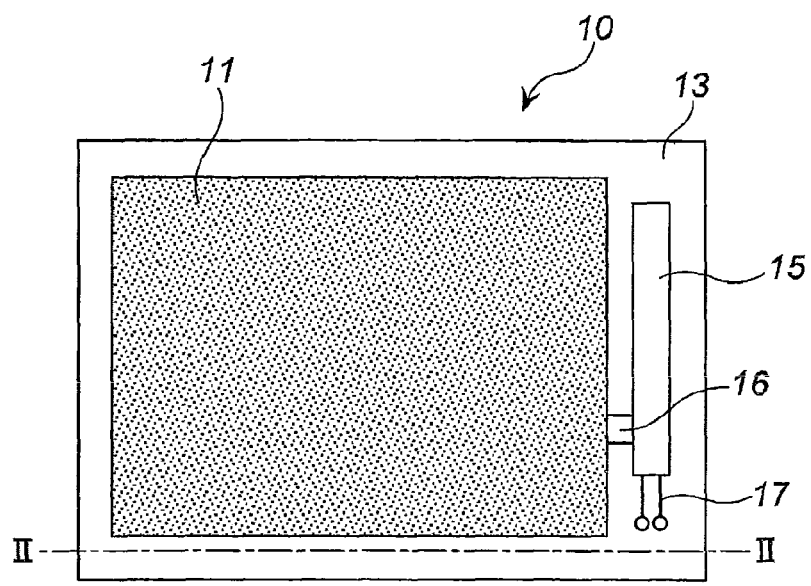
[FIG. 1] A cross sectional view of a shock absorbing apparatus of the present invention in the width direction.
Figure 2:
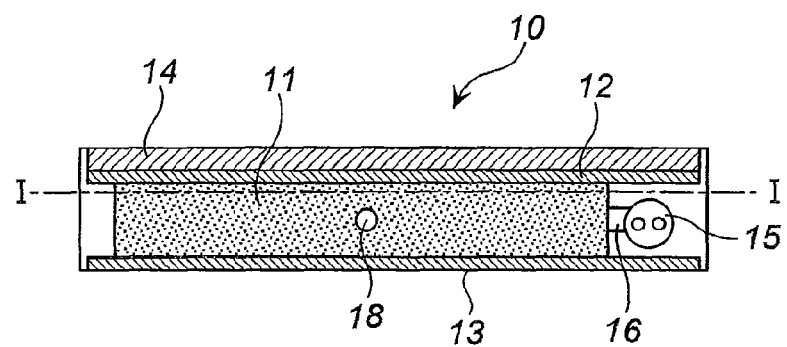
[FIG. 2] A cross sectional view of the shock absorbing apparatus of the present invention in the thickness direction.

EMBODIMENTS OF THE INVENTION (1) Shock Absorbing Apparatus for Aircraft Seat in FIG. 1 and FIG. 2

A description is given to a shock absorbing apparatus for an aircraft seat shown in FIG. 1 and FIG. 2. FIG. 1 is a cross sectional view of a shock absorbing apparatus in the width direction (a cross sectional view along the I-I line in FIG. 2), and FIG. 2 is a cross sectional view in the thickness direction (a cross sectional view along the II-II line in FIG. 1).

A shock absorbing apparatus 10 has an airbag 11 being expanded in a plate shape in a state of less than the maximum expansion (that is, a state in which there is still room for expansion), an upper flat plate 12 arranged on one side of the airbag 11, and a lower flat plate 13 arranged on another side of the airbag 11. On the upper flat plate 12, a cushion 14 is arranged on which a crew or a passenger is seated.

The shock absorbing apparatus 10 further has a gas supply device 15 to supply a gas to the airbag 11. The airbag 11 and the gas supply device 15 are connected with each other via a gas supply tube 16.

A woven fabric made of plastics, such as nylon, that is widely used for airbag apparatuses for automobiles and the like can be used for the airbag 11, and it is also possible, in order to enhance the airtight property, to use those further coated with a silicone resin or the like or those having a double structure by inserting a airtight bag.

The upper flat plate 12 and the lower flat plate 13 are made of metal, a synthetic resin, a fabric, a cardboard, wood or a composite material thereof.

The airbag 11 may also be held (held not to "move" lengthwise) or be fixed by one or both of the upper flat plate 12 and the lower flat plate 13.

As a method of holding or fixing an airbag, it is possible to employ a method of firmly fixing the air bag with an adhesive, a method of creating a portion where air does not enter in the airbag 11 and fixing the air bag at the portion to the upper flat plate 12 or the lower flat plate 13 with a bolt and a nut, a method of creating a recess surrounded by a frame in the upper flat plate 12 or the lower flat plate 13 to fit the airbag 11 into there, or the like.

For the gas supply device 15, various known inflators, that are widely used for airbag apparatuses for automobiles and the like can be used. Such an inflator may be any of those having a gas generation source mainly of a gas generating agent, those using both a gas generating agent and a pressurized gas (such as argon or helium), and those mainly of a pressurized gas.

The gas supply device 15 is connected via a conductive wire (lead wire) 17 to a detector (not shown) that sends a signal to activate the gas supply device by a preset condition. As the detector, those combining a sensor with a control unit can be used that are widely used for air bag apparatuses for automobiles and the like. The preset condition in the detector may include a change in the altitude of the aircraft (a change in the atmospheric pressure due to rapid descent), the gravity applied to the seat, a change in acceleration, a degree of deformation of the seat, and the like.

The shock absorbing apparatus 10 can be equipped with gas discharge member or means 18 for deflation of the airbag 11 by discharging an excessive amount of gas from the airbag 11 after the gas is supplied to the airbag 11 from the gas supply device 15. The gas discharge member 18 may be provided with an on-off valve such as a solenoid valve, an orifice valve or a rupture disk. The valve opens to discharge gas only in a case that an excessive amount of gas is supplied to the airbag 11.

The shock absorbing apparatus 10 can also be in a form that the entire apparatus is surrounded by a stretchable bag member, for example, a bag made of thin rubber or plastics. By making the entire apparatus in a form of being surrounded by a stretchable bag member in such a manner, storage and transportation are facilitated in addition that it can also be installed in an aircraft seat directly, so that the workability is improved.

Figure 3:
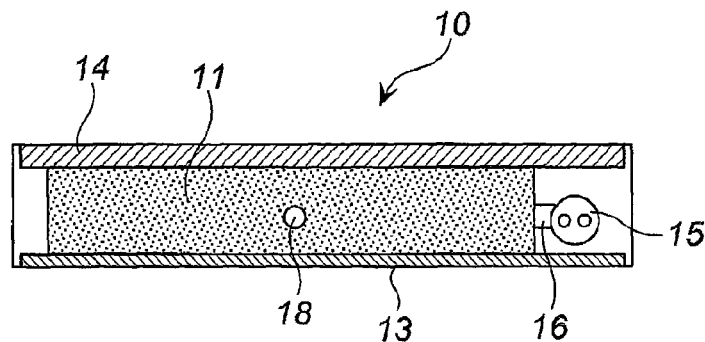
[FIG. 3] A cross sectional view of a shock absorbing apparatus, which is another embodiment of the present invention, in the thickness direction similar to FIG. 2.

Although the shock absorbing apparatus 10 of the present invention can have both the upper flat plate 12 and the lower flat plate 13 as illustrated in FIG. 1 and FIG. 2, it can also have the upper flat plate 12 only or have the lower flat plate 13 only as illustrated in FIG. 3

FIG. 3 is a cross sectional view of a shock absorbing apparatus 10 for an aircraft seat having the lower flat plate 13 only in the thickness direction similarly to FIG. 2. The shock absorbing apparatus in FIG. 3 is the same as the shock absorbing apparatus in FIG. 2 except that not being provided with the upper flat plate 12.

Figure 4:
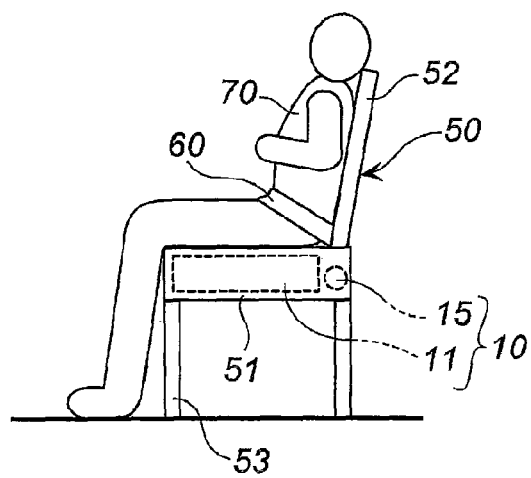
[FIG. 4] A side view of a seat for an aircraft, in which a shock absorbing apparatus of the present invention is installed, in a state that a person is seated.

(2) Aircraft Seat in FIG. 4

Next, an aircraft seat using the shock absorbing apparatus for an aircraft seat in FIG. 1 and FIG. 2 is described with reference to FIG. 4. It should be noted that it is also possible to use the shock absorbing apparatus for an aircraft seat in FIG. 3. In FIG. 4, a state is illustrated in which a passenger 70 is seated on an aircraft seat 50, fastening a seatbelt 60. The aircraft seat 50 has a seat unit 51, a backrest unit 52, and a leg unit 53.

The shock absorbing apparatus 10 is located inside the seat unit 51 of the aircraft seat 50 and is not seen from the outside. It should be noted that the passenger 70 may sit directly on the cushion 14 of the shock absorbing apparatus 10 or the cushion 14 may also be combined further with another cushion.

Although the state of installing the shock absorbing apparatus 10 varies from the structure of the seat 50, the shock absorbing apparatus 10 can be installed, for example, in such a manner that the lower flat plate 13 is supported by a metal or synthetic resin frame inside the seat unit 51. It should be noted that, when installed so as to be supported by a metal or synthetic resin frame inside the seat unit 51 in such a manner, the lower flat plate 13 can be omitted by making the metal or synthetic resin frame itself function as the lower flat plate 13. The shock absorbing apparatus 10 may also be disposed on the seat unit 51 depending on the form of the seat.

The gas supply device 15 of the shock absorbing apparatus 10 is connected via the conductive wire (lead wire) 17 to a detector and a power source that are not shown but necessary.

Next, behavior of the shock absorbing apparatus 10 stored in the aircraft seat 50 will be described. During a normal flight, the airbag 11 of the shock absorbing apparatus 10 is in a state of less than the maximum expansion, preferably in a state of being expanded at an expansion pressure of a degree in which the passenger 70 can feel comfortable to sit on.

After that, when the aircraft carries out an abnormal flight such as rapid descent, an activation signal is sent from a detector, that have detected the abnormality, to the gas supply device 15. With that, the gas supply device 15 is activated and a gas is supplied to the inside of the airbag 11 through the gas supply tube 16, and the airbag is expanded to a predetermined maximum pressure before the aircraft lands or when it has landed, that is, before or when the passenger 70 is subject to the shock. Then, when the aircraft carries out body landing or the like, the shock at the time of landing is absorbed by the airbag 11 with the enhanced internal pressure and the shock to the passenger 70 is attenuated.

In addition, by providing the shock absorbing apparatus 10 with the gas discharge member 18, once after absorbing the shock by the airbag 11 with the enhanced internal pressure, the gas is discharged by the gas discharge member 18 in accordance with the degree of shock to which the passenger 70 is subjected, and thereby the bounce of the airbag 11 is reduced and the shock to the passenger 70 is further attenuated.

Figure 5:
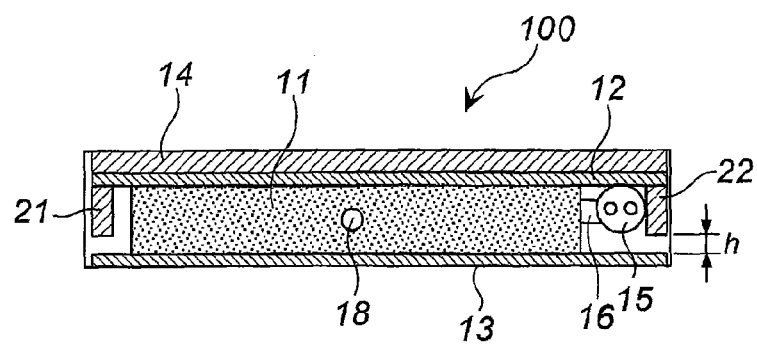
[FIG. 5] A cross sectional view of a shock absorbing apparatus, which is another embodiment of the present invention, in the thickness direction.

(3) Shock Absorbing Apparatus for Aircraft Seat in FIG. 5

A shock absorbing apparatus 100 for an aircraft seat in FIG. 5 will be described. FIG. 5 is a cross sectional view equivalent to FIG. 2, and the same numerals as those in FIG. 1 and FIG. 2 refer to the same members.

In the apparatus 100 illustrated in FIG. 5, the upper flat plate 12 has lowering restriction members 21 and 22 in a plate shape vertically installed on the airbag 11 side. The lowering restriction members 21 and 22 are formed over almost the entire length of the upper flat plate 12 in the short side direction (the direction same as the short side direction of the lower flat plate 13 in FIG. 1). Between the lower flat plate 13 and the lowering restriction members 21 and 22, an interval h exists. The positions of locating the lowering restriction members 21 and 22 are not particularly limited as long as there is no problem of activating the shock absorbing apparatus, and for example, a plurality of lowering restriction members may also be arranged on the entire circumference of the upper flat plate 12 at intervals.

Next, behavior of the apparatus 100 illustrated in FIG. 5 when located in the aircraft seat 50 as illustrated in FIG. 4 will be described.

During a state of a normal flight, the airbag 11 of the shock absorbing apparatus 100 is in a state of less than the maximum expansion, preferably in a state of being expanded at an expansion pressure of a degree in which the passenger 70 can feel comfortable to sit on.

When the aircraft carries out an abnormal flight such as rapid descent, an activation signal is sent from a detector, that has detected the abnormality, to the gas supply device 15. With that, the gas supply device 15 is activated and a gas is supplied to the inside of the airbag 11 through the gas supply tube 16, and the airbag is expanded to a predetermined maximum pressure before the aircraft lands or when it has landed, that is, before or when the passenger 70 is subject to the shock. Then, when the aircraft carries out body landing or the like, the shock to the passenger 70 is attenuated by the airbag 11 with the enhanced internal pressure.

By providing the shock absorbing apparatus 100 with the gas discharge member 18, once after absorbing the shock by the airbag 11 with the enhanced internal pressure, the gas is discharged by the gas discharge member 18 in accordance with the degree of shock to which the passenger 70 is subjected, and thereby the bounce of the airbag 11 is reduced and the shock to the passenger 70 is attenuated.

At this time, when the degree of deflation of the airbag 11 is too large, the seat unit 51 rapidly sinks down in conjunction with the lowering of the upper flat plate 12, and thereby there is also a possibility that the passenger 70 is accelerated in the lowering direction and shock is applied to the passenger 70. However, in the apparatus 100 illustrated in FIG. 5, when the airbag 11 is deflated, the sinking down of the seat unit 51 is stopped at the time when the lowering restriction members 21 and 22 are lowered by the interval h and touch the lower flat plate 13, so that the shock to the passenger 70 due to the lowering is attenuated. The lowering restriction members 21 and 22 can be made of metal or a synthetic resin, and a material may also be used that relieves the shock by deforming appropriately, for example, an elastomer, such as pressure resistant rubber, and thus the shock at landing can be absorbed in two stages.

Figure 6:
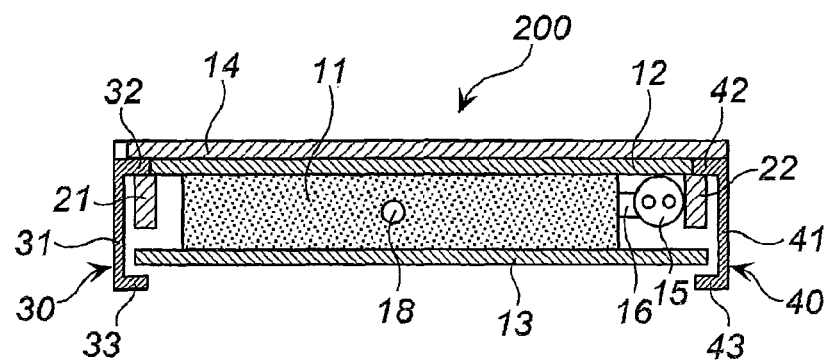
[FIG. 6] A cross sectional view of a shock absorbing apparatus (before activation), which is another embodiment of the present invention, in the thickness direction.
Figure 7:
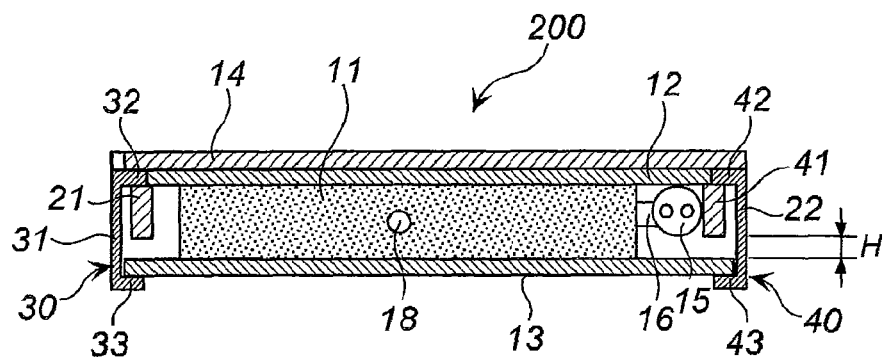
[FIG. 7] A cross sectional view of the shock absorbing apparatus in FIG. 6 after activation.

(4) Shock Absorbing Apparatus for Aircraft Seat in FIG. 6 and FIG. 7

A shock absorbing apparatus 200 for an aircraft seat shown in FIG. 6 and FIG. 7 will be described. FIG. 6 illustrates a state before activation and FIG. 7 illustrates a state after activation or during activation, and either is a cross sectional view equivalent to FIG. 2. In FIG. 6 and FIG. 7, the same numerals as those of FIG. 1, FIG. 2, and FIG. 5 refer to the same members.

The apparatus 200 illustrated in FIG. 6 has rising restriction members 30 and 40 in addition to the lowering restriction members 21 and 22. The rising restriction members 30 and 40 are arranged over almost the entire length of the upper flat plate 12 in the short side direction (the direction same as the short side direction of the lower flat plate 13 in FIG. 1). The rising restriction members 30 and 40 can be made of metal or a synthetic resin. The positions of locating the rising restriction members 30 and 40 are not particularly limited as long as there is no problem of activating the shock absorbing apparatus, and for example, a plurality of lowering restriction members may also be arranged on the entire circumference of the upper flat plate 12 at intervals.

The rising restriction member 30 has a side plate 31, and an upper projection plate 32 and a lower projection plate 33 vertically installed from both ends of the side plate 31 in the same direction in the same length. The rising restriction member 40 has a side plate 41, and an upper projection plate 42 and a lower projection plate 43 vertically installed from both ends of the side plate 41 in the same direction in the same length.

The rising restriction member 30 has the upper projection plate 32 fixed to an end portion of the upper flat plate 12. The rising restriction member 40 has the upper projection plate 42 fixed to an end portion of the upper flat plate 12.

As illustrated in FIG. 6, before activation, an interval is created between the lower flat plate 13, and the lower projection plate 33 and the lower projection plate 43 respectively. It should be noted that, when the apparatus 200 is disposed inside the seat unit 51 of the aircraft seat 50 as illustrated in FIG. 4, the entire apparatus 200 is supported by installing the lower flat plate 13 in the metal or synthetic resin frame in the seat unit 51.

Next, behavior of the apparatus 200 illustrated in FIGS. 6 and 7 when located in the aircraft seat 50 as illustrated in FIG. 4 will be described.

During a state of a normal flight, the airbag 11 of the shock absorbing apparatus 200 is in a state of less than the maximum expansion, preferably in a state of being expanded at an expansion pressure of a degree in which the passenger 70 can feel comfortable to sit on.

When the aircraft carries out an abnormal flight such as rapid descent, an activation signal is sent from a detector, that has detected the abnormality, to the gas supply device 15. With that, the gas supply device 15 is activated and a gas is supplied to the inside of the airbag 11 through the gas supply tube 16, and the airbag 11 is expanded to a predetermined maximum pressure before the aircraft lands, that is, before the passenger 70 is subjected to the shock.

At this time, the lower flat plate 13 abuts against the lower projection plates 33 and 43 of the rising restriction members 30 and 40, thereby limiting the distance between the upper flat plate 12 and the lower flat plate 13 to suppress the upward expansion of the airbag 11, so that the rising of the upper flat plate 12 due to the expansion of the airbag 11 is suppressed. That is, the rising of the seat unit 51 in conjunction with the upper flat plate 12 is suppressed. Therefore, it no longer happens that the seatbelt 60 fastens the passenger 70 excessively due to the rising of the seat unit 51. It should be noted that, since the lower flat plate 13 is restricted by the lower projection plates 33 and 43, the internal pressure is maintained to the extent that the airbag 11 can absorb the shock.

FIG. 7 illustrates a state that the rising of the upper flat plate 12, connected with the rising restriction members 30 and 40, is restricted by restricting the lower flat plate 13 with the lower projection plates 33 and 43, and in the state of FIG. 7, an interval H exists between the lower flat plate 13, and the lowering restriction members 21 and 22. The interval H may also be the distance same as the interval h illustrated in FIG. 5 or a distance larger than the interval h to the extent not to fasten the passenger 70 excessively with the seatbelt 60. In accordance with the degree of shock upon the passenger 70, the airbag has an enhanced internal pressure and attenuates the shock, and then the airbag 11 is deflated, by discharging gas with the gas discharge member 18 and thereby the protection of the passenger 70 from the shock is more intensified.

At this time, when the degree of deflation of the airbag 11 is too large, the seat unit 51 rapidly sinks down, and thereby there is also a possibility that shock is applied to the passenger 70. However, in the apparatus 200 illustrated in FIG. 6, when the airbag 11 is deflated, the sinking down of the seat unit 51 is stopped at the time when the lowering restriction members 21 and 22 touch the lower flat plate 13, so that the shock to the passenger 70 due to the lowering is attenuated.

The shock absorbing apparatus of the present invention is applicable to aircrafts, in particular to small sized aircrafts, helicopters, and the like.

The invention claimed is:

1. A shock absorbing apparatus for an aircraft seat, comprising:
 an airbag being expanded in a plate shape in a state of less than the maximum expansion;
 an upper flat plate arranged on one side of the airbag;
 a lower flat plate arranged on another side of the airbag;
 a gas supply device that supplies a gas to the airbag; and
 a detector sending a signal to activate the gas supply device under a preset condition,
 wherein
 the upper flat plate has a lowering restriction member arranged vertically on the airbag side,
 the lower flat plate is arranged at an interval from the lowering restriction member, and
 the lowering restriction member of the upper flat plate abuts against the lower flat plate when the airbag deflates after activation, and thereby lowering of the upper flat plate is restricted.

2. The shock absorbing apparatus for an aircraft seat according to claim 1, wherein
 the upper flat plate has a rising limitation member arranged vertically on the airbag side, and
 the lower flat plate abuts against the rising limitation member due to expansion of the airbag after activation to limit a distance between the upper flat plate and the lower flat plate and to suppress excessive expansion of the airbag.

3. The shock absorbing apparatus for an aircraft seat according to claim 1, further comprising:
 a gas discharge member that deflates the airbag by discharging an excessive amount of gas from the airbag after the gas is supplied from the gas supply device to the airbag.

4. The shock absorbing apparatus for an aircraft seat according to claim 1, wherein the apparatus is entirely surrounded by a stretchable bag member.

5. The shock absorbing apparatus for an aircraft seat according to claim 1, wherein the apparatus is configured to be located inside a seat unit of the aircraft seat or on the seat unit.

6. An aircraft seat, comprising:
 a seat unit of the aircraft seat; and
 the shock absorbing apparatus according to claim 1,
 wherein the shock absorbing apparatus is located inside the seat unit or on the seat unit.

* * * * *

UNITED STATES PATENT AND TRADEMARK OFFICE
CERTIFICATE OF CORRECTION

PATENT NO. : 8,573,690 B2
APPLICATION NO. : 13/057442
DATED : November 5, 2013
INVENTOR(S) : Hirokazu Shoji et al.

It is certified that error appears in the above-identified patent and that said Letters Patent is hereby corrected as shown below:

ON THE TITLE PAGE:

At item (73), Assignee, change:

"(73) Assignee: Japan Aerospace Exploration Agency, Osaka-shi (JP)"

to: --(73) Assignees: Japan Aerospace Exploration Agency, Chofu-shi, Tokyo (JP); Daicel Chemical Industries, Ltd., Osaka-shi, Osaka (JP)--.

Signed and Sealed this
Seventeenth Day of June, 2014

Michelle K. Lee
*Deputy Director of the United States Patent and Trademark Office*